United States Patent [19]

Mahdjuri

[11] 4,313,423
[45] Feb. 2, 1982

[54] SOLAR COLLECTOR WITH HEAT PIPE

[76] Inventor: Faramarz S. Mahdjuri, Via S. Sebastiano 33, Bergamo, Italy

[21] Appl. No.: 40,522

[22] Filed: May 21, 1979

[30] Foreign Application Priority Data

Jun. 2, 1978 [CH] Switzerland .................. 6034/78

[51] Int. Cl.³ .............................................. F24J 3/02
[52] U.S. Cl. .................................... 126/433; 126/417; 126/443; 165/104.21; 165/74
[58] Field of Search ............... 126/433, 443, 446, 417; 165/105, 76, 173, 104.21, 74; 285/20, 19, 22, DIG. 4, DIG. 11

[56] References Cited

U.S. PATENT DOCUMENTS

| | | | |
|---|---|---|---|
| 1,294,018 | 2/1919 | Zahm et al. | 285/20 X |
| 1,487,353 | 3/1924 | Nolte | 165/74 X |
| 2,992,313 | 7/1961 | Taylor | 165/105 X |
| 3,476,175 | 11/1969 | Plevyak | 165/104.21 |
| 3,656,035 | 4/1972 | Corman et al. | 165/104.21 |
| 3,907,334 | 9/1975 | Schera, Jr. | 285/20 |
| 4,119,085 | 10/1978 | Knowles et al. | 165/105 X |
| 4,127,105 | 11/1978 | Walt | 165/105 X |
| 4,131,785 | 12/1978 | Shutt | 165/105 X |
| 4,134,388 | 1/1979 | Kersten et al. | 126/443 |

*Primary Examiner*—Larry Jones
*Attorney, Agent, or Firm*—Schroeder, Siegfried, Vidas, Steffey & Arrett

[57] ABSTRACT

A solar collector is disclosed the constructional structure of which has been simplified in such a way that the condenser system of the collector is inserted in the channel through which the gaseous or liquid heat-transfer medium flows by means of a sealing system comprising a gasket member and screwably operable tightening means.

Assembly and overhauling of the condenser system are greatly facilitated.

10 Claims, 8 Drawing Figures

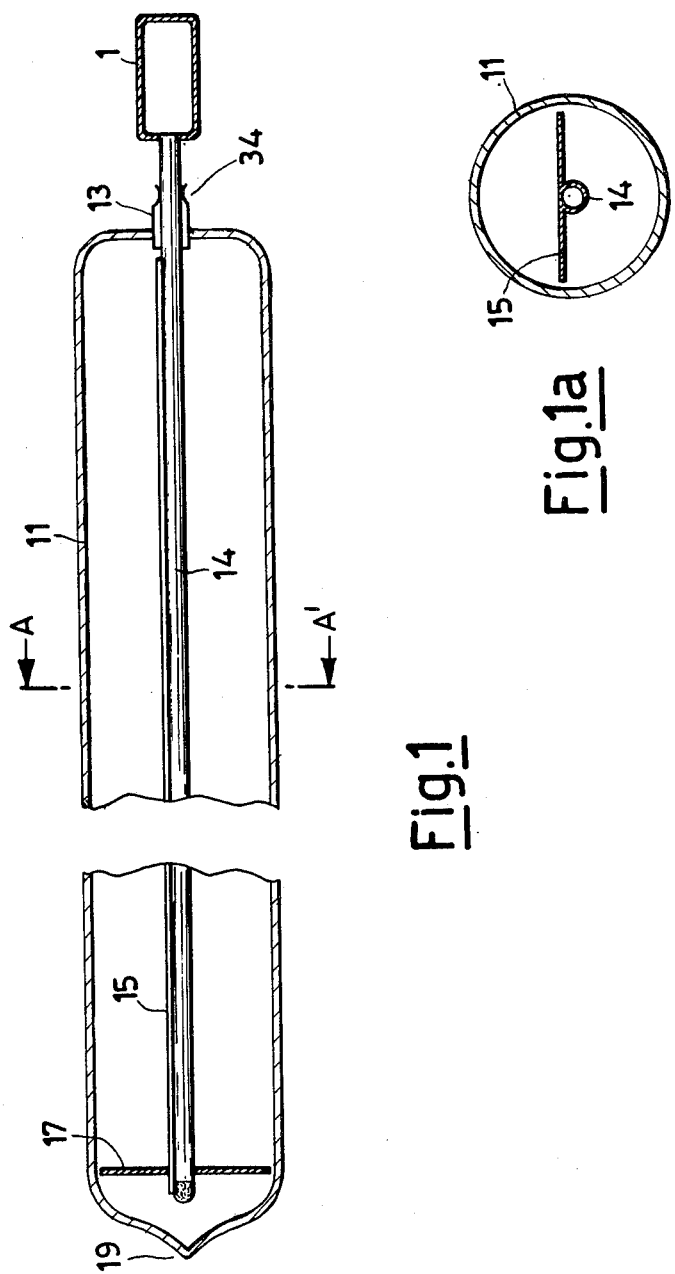

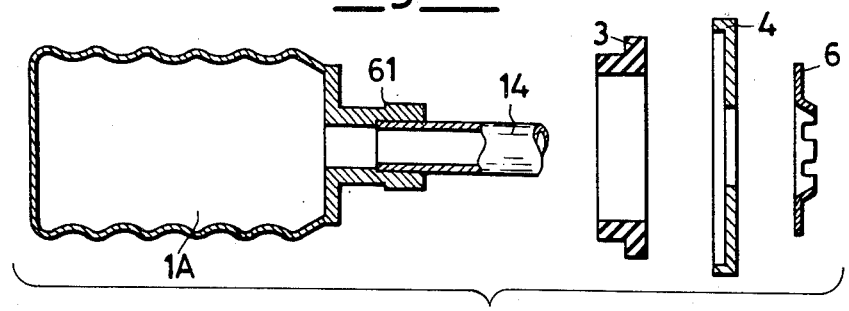
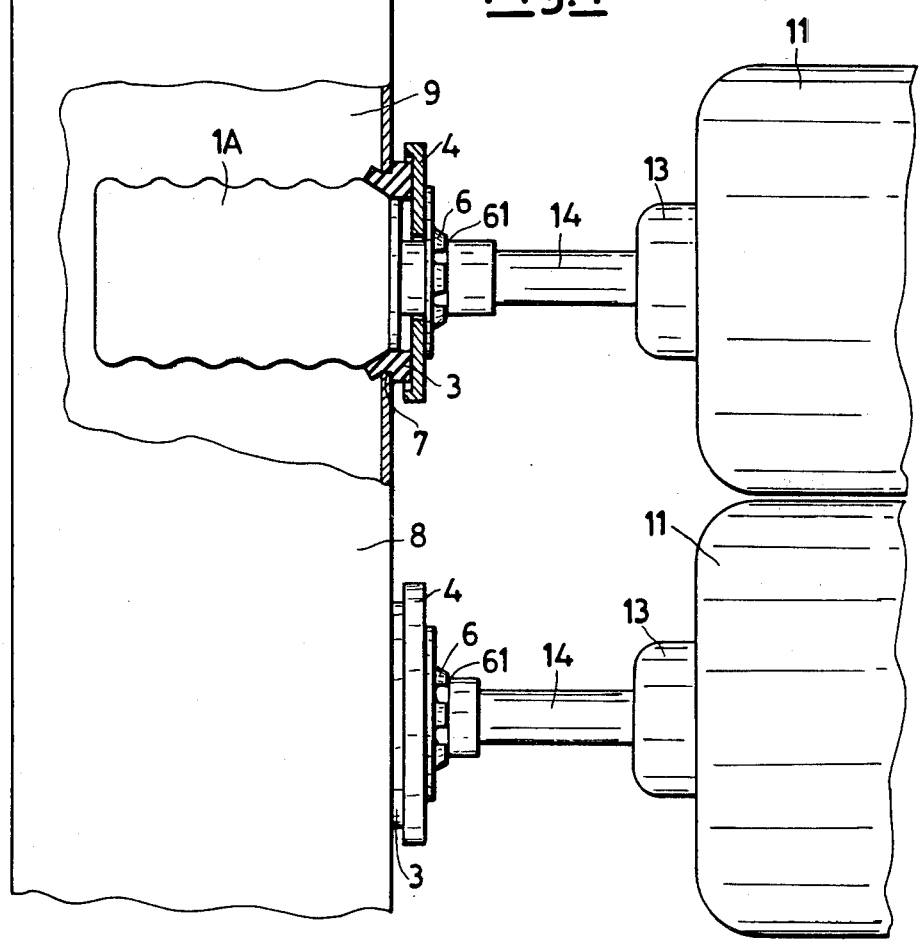

SOLAR COLLECTOR WITH HEAT PIPE

This invention relates to a solar collector, having a transparent cover and with an absorbing compartment of planar configuration for absorbing solar radiations, equipped with at least a closed tubular body extended longitudinally, confined by metallic walls and enclosing an operative fluid capable of being vaporized (fluid heat-transferring means), which has a vaporization compartment placed in thermal contact with said absorber, and also a condensing compartment which, during the operation of the system, is spatially at a higher level, said condenser being susceptible of being inserted in a channel wherein a fluid heat transferring means is caused to flow therethrough, the invention being characterized in that the condenser of the collector is inserted or fastened in a sealtight manner in the channel for the fluid heat-transferring means by a resilient seal 3, the latter being urged or pressed by a resiliently snapping disc 4 against a conical portion 2 of said condenser 1, so that the seal is thrust over the conical portion 2.

The task of the solar collectors is to convert the predominant portion of the luminous radiations of the solar spectrum into heat and to transfer the latter with the maximum possible efficiency to a fluid heat transferring means which is, for example, water or air.

HEAT TUBES

The heat tubes are apparatus the essential function of which is to transfer and to distribute heat by vaporization and condensation of a working fluid (heat-transfer medium). The principal feature of these is that the energy which is required for the flow of the liquid and the vapour in the presence of the gravity pull and in relationship with the losses due to sliding friction is completely provided by the heat source, so that no external pumping source is necessary. The use of tubular heating bodies in the solar collectors is conventional (see for example the specification of the German Pat. No. 2646 987.4, the U.S. patent application Ser. No. 625,650, or the paper ASE of Essener Tagung of February 1977, page 35). However, contrary to what occurs in the conventional embodiments mentioned above, it is not necessary to use any wick or capillary cavity for pumping the working fluid which has been condensed, from the condenser to the vaporizing compartment, since the collector is at an angle relative to the horizontal line and the condenser is at a higher level than the vaporizator, so that in this case the gravity pull provides to the feedback to the vaporizing compartment (collector's absorber).

HEAT EXCHANGING SYSTEM

The structural composition of the condenser of a heat tube collector is one of the most important component parts of the collector. It is necessary to provide an efficient heat transfer from the compartment of the condenser and also to the heat exchange of the same. It is necessary to design the surface of the condenser in a way which is corresponding to the collector's surface. It is required moreover to resort to special expedients so as to have a small thermal resistance between the compartment of the condenser and the fluid heat-transfer medium.

ASSEMBLY

It is required, furthermore, that the units of the collector be susceptible of being readily assembled and that they be capable of taking up the tolerances which are usual in this field of the technology. In addition, it is necessary that these component parts be easily replaceable.

The main object of the present invention is to provide a solar collector having a high efficiency and which can be constructed cheaply, and can readily be assembled and overhauled and the structure of which is simple.

A few preferred practical embodiments of this invention will now be described hereinafter with reference to the accompanying drawings, wherein:

FIG. 1 is a longitudinal cross-sectional view of the collector.

FIG. 1a is a transversal cross-sectional view taken along the line A—A of FIG. 1.

Figure 2A:
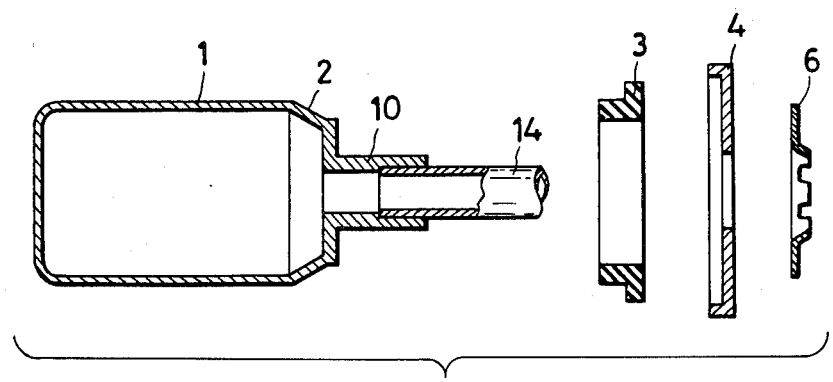
FIGS. 2 and 2a show a longitudinal cross-sectional view of the condenser and the heat-transfer channel in the assembled position, and in exploded view, respectively.
Figure 2:
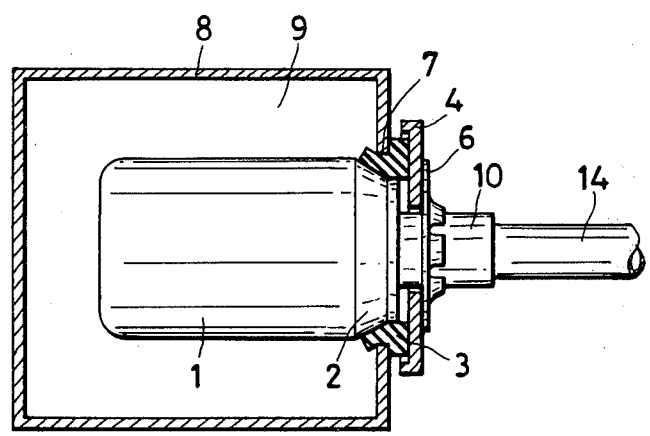
Figure 3A:
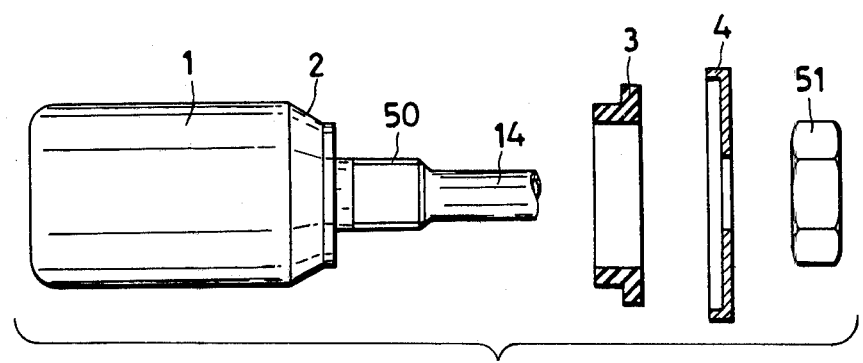
Figure 3:
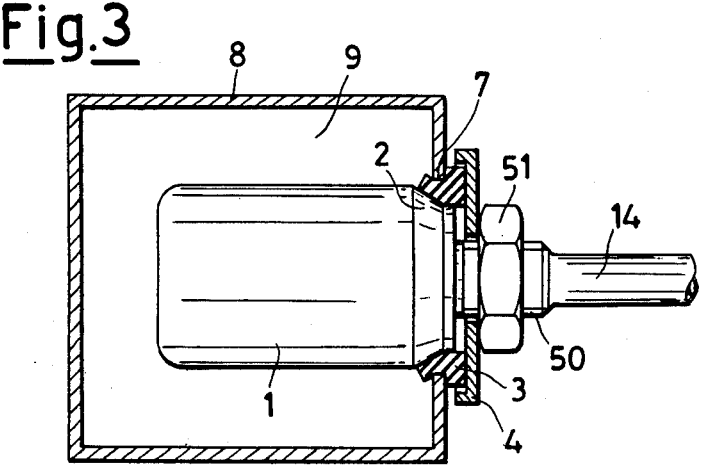

FIGS. 3 and 3a show views similar to FIGS. 2 and 2a of an alternative embodiment, and FIGS. 4 and 4a are views in elevation and partly in cross-section of a further embodiment of the condenser-heat transfer channel assembly, the showing of FIG. 4a being an exploded view.

The solar collector and its heat exchanging system of the condenser will now be described in detail with reference to the drawings. In these, FIG. 1 shows a practical embodiment of the collector in lengthwise cross-sectional view, FIG. 1a being a transversal cross-sectional view taken along the line A—A of FIG. 1 as aforesaid. The collector shown in the drawing has a tubular transparent body for covering, formed by glass 11, which is closed at one end, The opposite end is united to a shaped metallic piece 13 by melting. The union by melting of the tubular glass body 11 with the shaped metallic piece 13 takes place with the aid of an interposer piece made of a special glass, such as a lead glass. The metallic shaped piece 13 is formed by a material the thermal expansion coefficient of which is, with a fair approximation, equal to that of glass, such as, for example, ferronickel. The metallic shaped piece 13 must fulfill two important tasks, viz.:

1. mechanical stability,
2. the thermal route must be the longest possible so that the heat losses along the duct may be minimized as far as practicable.

The tubular body of the plate of the absorber 14 is closed at one end in a vacuum-tight manner, whereas the other end of the body is connected to the condenser 1 through a metallic tubular body.

The absorber 15 is retained within the tubular covering body 11 by means of a reflector 17 of planar configuration, which is extended at the end of the cylindrical portion of the tubular covering body 11 transversally of the axis of such tubular body. The reflector 17 is made, for example, of mica (due to the poor thermal conductivity of this material) on which aluminum has been vaporized or on which an aluminum leaf has been applied.

The tubular body 14 and the shaped piece 13 are connected to one another in position, at 34, in a vacuum-tight manner. On the front surface of the glass tubing, there is an exhaust tip 19 formed by melting and through which the interior of the tubular casing 11 is evacuated until reaching a pressure of residual gases of less than $10^{-2}$ Torr.

FIGS. 2, 2a, 3, 3a and 4, 4a show a number of different practical embodiments of the assembly of the condenser. In these FIGURES, the heat-exchanging system 1, of the condenser, a conical end portion 2 is connected to the tubular body 14 by a shaped piece. A gasket 3, made, for example, of rubber, has a tubular portion of an outside diameter which corresponds to the outside diameter of the condenser 1. It also has a flange portion.

When incorporating the condenser 1 in the channel for the heat-transferring fluid 8, the condenser is passed through the port 7. Then the gasket 3, is passed through the port and slipped onto the conical portion 2. In FIGS. 2, 2a, the shaped piece is smooth and identified by the numeral 10. A disc 4 is passed over the piece 10 and clamped against the gasket flange portion while the condenser system is pulled out by a spring ring 6. In FIGS. 3, 3a the piece is externally threaded and identified by the numeral 50. A screw-threaded nut 51 engages the piece 50 and provides the necessary pressure.

The inset 61 of FIGS. 4 and 4a has a shoulder to effect the positioning of the resilient ring 6. This resilient ring 6 provides, in addition, a constant static pressure of the disc 4 against the gasket 3. The external surface of the condenser 1 can be extended by undulations as shown at 1a in FIGS. 4 and 4a, so that the heat exchange of the condenser with the heat-transferring fluid 9 (water or air) is improved concurrently with the improvement of the internal condensation effect.

The active surface of the condenser 1 (or 1A) for solar collectors should be, approximately, the 5% to the 8% of the absorption surface of the collector.

As working fluids for the heat tubes there can be suggested, among others, Freon 11, Freon 12, propane and water.

I claim:

1. A collector for solar radiation, said collector comprising an elongated tube having a closed end and an open end, and a vaporizable heat-transferring medium therein, absorber means at one end of said tube and a condenser connected to said open end of said tube, said condenser having a conical end portion and a larger cross-sectional dimension than that of said elongated tube; a flow channel having a heat-transfer medium therein, said flow channel having a planar wall portion having an exterior surface and an opening therein; a resilient annular gasket, said gasket including a tubular portion and a flange portion, said tubular portion extending through said opening in said wall portion with said flanged portion abutting said wall portion around said opening, and clamp means carried by said condenser externally of said channel drawing said condenser conical end portion against the planar wall portion while pressing said flange portion against said exterior of said wall portion thereby sealing said condenser within said flow channel.

2. Solar collector according to claim 1, characterized in that the condenser has a cylindrical shape.

3. A solar collector according to claim 1 wherein said clamp means includes a spring disc.

4. A solar collector according to claim 3 wherein said condenser has a shoulder behind which said spring disc is engaged.

5. A solar collector according to claim 1 wherein said clamp means includes screw threaded pressure exerting components.

6. A solar collector according to claim 1 wherein said condenser has a wall of undulated section.

7. A solar collector according to claim 1 wherein said condenser has a heat transfer surface of an area on the order of 5 to 8% of the area of the heat absorbing surface of said absorber means.

8. A solar collector according to claim 1 wherein said opening has a cross-section greater than that of said condenser wherein said cndenser may be inserted into said flow channel through said opening.

9. A solar collector according to claim 1 wherein there are a plurality of said openings, and a condenser extends into said flow channel through each of said openings.

10. A solar radiation collector assembly, comprising:
flow channel means for enclosing a heat transfer medium therein and having a planar wall portion with an opening therein;
an elongated tube having a open end and a closed end, said tube passing through the opening in said wall portion and having a vaporizable heat transferring medium enclosed therin; said tube having absorber means at one end thereof outside said flow channel means and condenser means connected to the open end thereof enclosed within said flow channel means said condenser having a larger cross-sectional dimension than that of said elongated tube, said condenser means having a conical neck portion at the interface with said tube; and
a resilient annular gasket surrounding said tube outside of said flow channel, said gasket including a tubular portion for covering at least a portion of the conical neck portion of said condenser means and forming a seal between the conical neck portion of said condenser and the inside of the opening through said wall portion, said gasket also including a flange portion for forming a seal on the outside of said flow channel means around the opening in said planar wall portion.

* * * * *